United States Patent
Friman et al.

(10) Patent No.: US 7,216,057 B2
(45) Date of Patent: May 8, 2007

(54) METHOD AND SYSTEM FOR ANALYZING CONTROL CIRCUIT PERFORMANCE IN INDUSTRIAL PROCESS

(75) Inventors: Mats Friman, Helsinki (FI); Timo Harju, Espoo (FI); Arto Marttinen, Vantaa (FI); Matti Ketonen, Helsinki (FI)

(73) Assignee: Metso Automation Oy, Helsinki (FI)

( * ) Notice: Subject to any disclaimer, the term of this patent is extended or adjusted under 35 U.S.C. 154(b) by 0 days.

(21) Appl. No.: 10/486,391

(22) PCT Filed: Aug. 29, 2002

(86) PCT No.: PCT/FI02/00700

§ 371 (c)(1),
(2), (4) Date: Feb. 10, 2004

(87) PCT Pub. No.: WO03/019312

PCT Pub. Date: Mar. 6, 2003

(65) Prior Publication Data

US 2004/0199360 A1    Oct. 7, 2004

(30) Foreign Application Priority Data

Aug. 31, 2001    (FI) .................................. 20011742

(51) Int. Cl.
*G06F 11/30*    (2006.01)
(52) U.S. Cl. ...................... 702/182; 702/183
(58) Field of Classification Search .................. 75/375;
156/345.13, 345.15, 345.24; 700/50, 51,
700/75, 76, 266, 33–36, 38–41, 43; 702/127,
702/182, 183, 188, 189
See application file for complete search history.

(56) References Cited

U.S. PATENT DOCUMENTS 4,675,147 A * 6/1987 Schaefer et al. ............ 376/245

(Continued)

FOREIGN PATENT DOCUMENTS

EP    0 378 377 A2    7/1990

(Continued)

OTHER PUBLICATIONS

Yepez, J; Marti, P; Fuertes, J; "Control Loop Performance Analysis Over Network Control Systems"; 28th Intn'l Conf on Industrial Electronics Society; vol. 4; Nov. 2002; pp. 2880-2885.*

(Continued)

*Primary Examiner*—John Barlow
*Assistant Examiner*—Douglas N Washburn
(74) *Attorney, Agent, or Firm*—Oliff & Berridge, PLC (57) ABSTRACT

The invention relates to a method for measuring and analyzing the performance of a control circuit in an industrial process. Different parameters (indices) illustrating the state of the control circuit are combined in an intelligent manner such that each combination of index (VI, IAE, CTI, OI) values represents a specific example state of the control circuit. The indices and combinations of their values are selected in advance on the basis of expert knowledge and process research. A momentary state of the control circuit is deduced by computing the performance indices on the basis of the measurement data illustrating the control loop operation and by examining which (one) of the predetermined index value combinations best correlate(s) with the corresponding reference combination values. The reference state representing the best correlating combinations is then deduced to be the momentary state of the control circuit.

19 Claims, 2 Drawing Sheets

U.S. PATENT DOCUMENTS 5,410,890 A     5/1995  Arima
6,047,220 A *   4/2000  Eryurek ..................... 700/28
6,424,876 B1 *  7/2002  Cusson et al. ............. 700/108
6,816,810 B2 * 11/2004  Henry et al. ................ 702/179

FOREIGN PATENT DOCUMENTS

EP      0 498 943 A1    8/1992
JP      03-201103    *  9/1991

OTHER PUBLICATIONS

Biao Huang; Shah, S; Kwok, E; "On-Line Control Performance Monitoring of MIMO Processes"; Proceedings of the American Control Conference; vol. 2; Jun. 21-23, 1995; pp. 1250-1254.*

* cited by examiner

METHOD AND SYSTEM FOR ANALYZING CONTROL CIRCUIT PERFORMANCE IN INDUSTRIAL PROCESS

FIELD OF THE INVENTION

The invention relates to a method for measuring and analysing the performance of a control circuit in an industrial process.

BACKGROUND OF THE INVENTION

Process control systems control industrial processes by means of various field devices connected to the process, such as regulating devices, control devices, transducers, transmitters, and the like. A typical field device is a control valve provided with a valve controller. Devices known as intelligent field devices are equipped with control logic or software which make it possible to control the field device locally, for example by means of a suitable control algorithm, to collect both status and measurement data, and/or to communicate with an automation system or a field device management system. A field device, such as an intelligent control valve, is typically controlled by a process controller applying a suitable control algorithm on the basis of the measurement results (feedback) obtained from the process and the set values. Thus, a so-called control loop is formed. A large industrial process may include a plurality, even hundreds, of such control loops.

Control loops (control circuits) are tuned during installation to produce a desired process operation as well as possible, and they can be controlled when process performance is to be upgraded, or for some other reason. There are a variety of indices and measurements representing the performance of a control system and a process. They all illustrate this important matter from different points of view. In each specific situation, suitable indices and measurements should be selected to describe the process performance in question. Performance indices are also interdependent, and the upgrading of performance on the basis of one index may weaken the performance when assessed according to some other performance index. Further, when a large number of control circuits and control loops are used, it is difficult for a control room personnel to perceive and analyse the effect of different process controls and the real performance of a control loop or a sub-process in relation to the desired performance.

A prior art method for monitoring control circuit performance is a simple control error measurement and monitoring. Data related to the control operations are collected on a substantially on-line basis, and different summaries are computed during the monitoring period on the basis of the control errors. These summaries include control error absolute value, control error square, variability, etc. Such methods are commonly used.

Another known solution for monitoring control circuit performance includes methods that aim at detecting control circuit oscillation. This kind of method is described for example in U.S. Pat. No. 5,719,788.

A third prior art method is to compare control circuit performance with a minimum variance control, which allows stochastic disturbances to be eliminated quicker than with other methods. In other words, an index is obtained that indicates how much better the control could operate in theory if a customized minimum variance control were in use. The user enters a process delay as a parameter, the delay being in theory an element restricting the speed of the control operation.

The above methods measure a single dimension of control performance. No information is obtained of the total condition of the circuit. For example, the above described control error measurement and monitoring fails to explain the type of the problems occurring in the control, even in the case of a major error. A major control error may occur for example because the control is saturated, there is a load disturbance or a change of mode, or because the circuit is operated in manual mode. On the other hand, certain control problems, such as individual measurement disturbances and noises or actuator oscillations do not appear unambiguously in a control error.

The detection of control circuit oscillation is a valuable piece of information as such, but similarly as control error measurement, it is an indicator that only detects a small portion of poorly functioning control circuits.

A comparison with minimum variance control does not take into account the fact that control circuits have individual speeds and different control circuits have highly differing target speeds. In addition, the speed of minimum variance control is fairly theoretical. In practice, delay is not the only factor restricting control speed.

SUMMARY OF THE INVENTION

It is an objective of the present invention is to provide a new method and system allowing control circuit performance to be monitored such that a better analysis of the overall state of the monitored control circuit is obtained than before.

This is achieved by a method according to claim 1, a diagnostic system according to claim 10, computer software according to claim 20, and a software product according to claim 21.

A basic idea of the invention is that different parameters (indices) illustrating the state of a control circuit are combined in an intelligent manner such that each combination of index values represents a specific example state of the control circuit. The indices and combinations of their values are selected in advance on the basis of expertise knowledge and process research. It is possible to find an index value combination that relatively reliably indicates each typical control circuit state. For example, when the control circuit value is close to the limit value (control saturated), the integral absolute error index is high and the control travel index is zero. The predetermined index combinations allow a momentary state of the control circuit to be deduced by computing the performance indices on the basis of the measurement data illustrating the control loop operation and by examining which (one) of the predetermined index value combinations best correlate(s) with the corresponding reference combination values. The reference state representing the best correlating combination is then deduced to be the momentary state of the control circuit. The state obtained on the basis of the deduction is easily illustrated and/or expressed by means of a verbal description, such as "control OK", or "control not OK, control saturated". The invention decreases the level of expertise required of the user and allows deductions to be produced automatically. Prior art methods require expert knowledge of the topics illustrated by the indices, and an expert is needed to combine the indices to produce a deduction. Moreover, prior art methods provide a limited description of control circuit operation, concentrating on a specific characteristic alone. In the present invention the selection of the indices ensures that the control circuit state can be evaluated on a continuous basis, and also retrospectively, taking into account a plural number of different factors having an effect on performance. The invention comprises a deduction machine, which perceives a plural number of indices simultaneously and automatically checks also more rarely occurring situations, which the user might not think of.

In a preferred embodiment of the invention the deduction is based on fuzzy logic. This provides a reliable method for identifying the most prevailing state of the control circuit in an ambiguous operational situation.

According to a preferred embodiment of the invention, the interpretation of a state is restricted when the control circuit is in an unrecognizable mode. In a further embodiment the interpretation of a control circuit state is restricted when the control circuit is not in the automated control mode, but in another operational mode, such as a manual control mode, forced control mode or locked mode. Compared with prior art methods based on calculation of separate parameters and not taking into account error situations in which the interpretation of a result is affected by an external factor, this enhances the reliability of the interpretation.

BRIEF DESCRIPTION OF THE DRAWINGS

In the following, the invention will be described by using the preferred embodiments as examples, and with reference to the accompanying drawings, in which.

DETAILED DESCRIPTION OF THE INVENTION

The present invention can be applied to all industrial processes, and the like, which comprise at least one process control loop and a control circuit. The process control loop or control circuit may comprise for example a process controller, field device controller and field device. The invention is not restricted to any particular field device, but can be applied in conjunction with diverse process-controlling field devices, i.e. process devices, such as control valves and pumps. Pumps are typically used for pumping material within, into or out of a process. The field device controller of a pump may be an inverter that controls the rotating speed of the pump. In the following examples however the preferred embodiments of the invention will be described using control valves and valve controllers as examples.

As stated above, the invention is applicable to different process automation systems. A process automation system typically comprises a controlling computer, which contains process controllers or is connected to them through a data network (Distributed Control System DCS). Another typical process control system is Direct Digital Control (DDC) in which the process controller is placed into a centralized computer system to which each device is connected via a separate control link, such as a HART (Highway Addressable Remote Transducer) link, which allows digital data to be transferred together with a conventional 4–20 mA analog signal. A state-of-the-art process automation system is provided in the form of Field Control System (FCS), in which a fully digital, high-speed network or databus interconnects a controlling network and field devices. The above description only covers some examples of process automation systems. It is to be noted that the implementation of the industrial process or process automation system is not relevant to the present invention.

Figure 1:
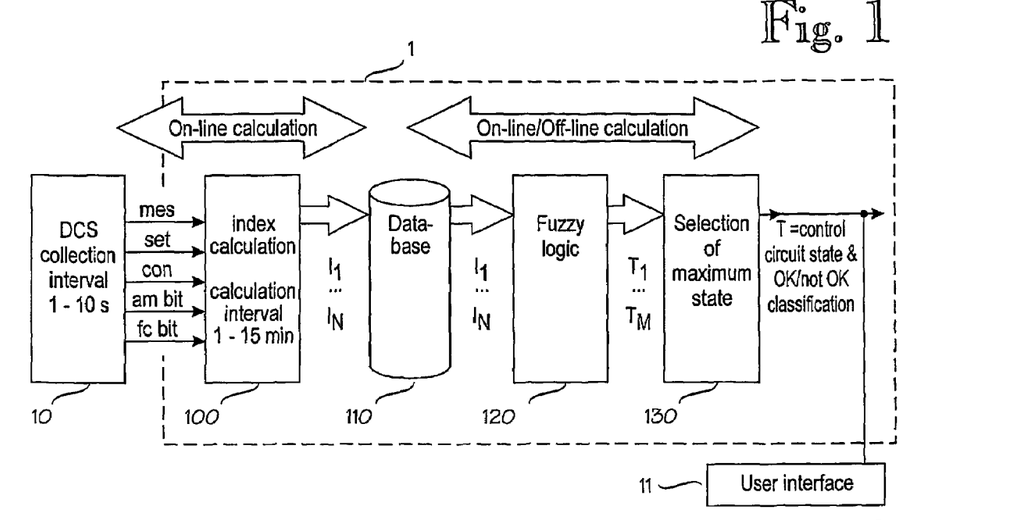
FIG. 1 is an operational block diagram illustrating different steps in the diagnosis of a control circuit of the invention and an interface with a process automation system.

In FIG. 1 the process automation system is generally depicted by block DCS 10. A diagnostic system 1 of the invention collects data illustrating the operation of the control circuit from the DCS system on an on-line basis in substantially real time, at intervals of one or some seconds, for example. On the basis of the collected operational data, indices illustrating the performance of the control circuit are calculated at suitable intervals. An intelligent classification of the control circuit state is then carried out on the basis of these indices and possibly a few other data elements representing the set state of the controller by applying fuzzy deduction.

Figure 2:
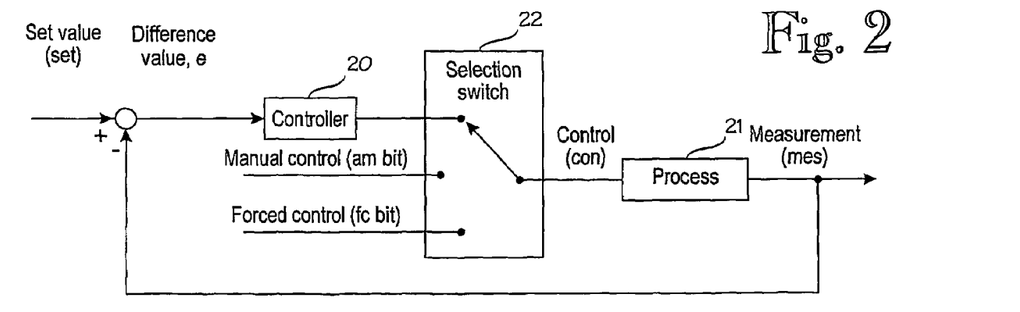
FIG. 2 is a block diagram illustrating a control circuit that can be monitored by applying the invention.

FIG. 2 is a schematic illustration of a control circuit the state of which can be identified using the present invention. The control circuit comprises a controller 20, which controls a valve within process 21, for example. In this kind of control circuit the values of interest in view of collection may include measurement (mes), set value (set) and control (con). In addition, data about the manual operation state (am bit) and forced control indicator (fc bit) of the control circuit may be collected. In a simple flow control, for example, the set value set may a desired flow value set by the operator, the control con may be the control (0%–100%) directed to the valve and calculated by the controller 20, and the measurement mes may be the flow measured from the process 21. A difference value e to be entered into the controller 20 is the difference between the set value set and the measurement mes. In other words, the difference value e, which may also be negative, expresses how far the measurement mes deviates from the desired value set. A selection switch 22 (operational mode switch) is used to select the mode in which the control circuit is to be operated, i.e. automated, manual or forced control. Automated control mode represents the normal state, in which the controller 20 controls the valve automatically according to the set value set of flow and the measured flow mes. Manual control means that the operator (momentarily, often in connection with a disturbance) uses manual control to set the valve position. Forced control is also a special situation and means for example that the protective logic of the control automatics controls the valve to open or close, for example if the level of the contents in a tank rises too high.

Data Collection

Figure 5:
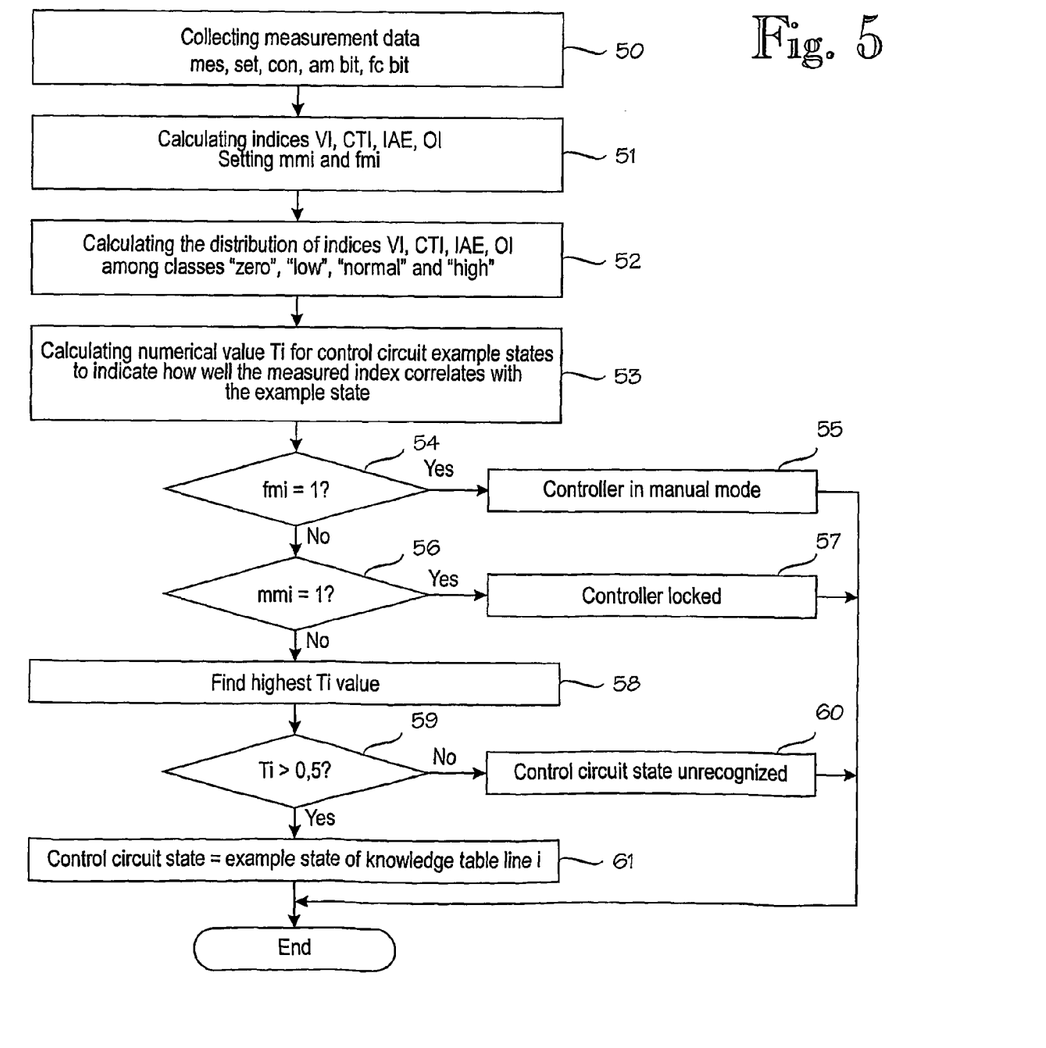
FIG. 5 is a flow diagram illustrating a control circuit diagnosis according to a preferred embodiment of the invention.

In FIG. 5 reference data is measured in step 50. The method used by the automation system DCS 10 to internally collect the data is not relevant to the invention. Between the diagnostics system 1 of the invention and the automation system DCS 10 only a suitable interface is required through which the desired on-line data can be collected. The data collected in the data collection and computation unit 100 of the diagnostics system is buffered for a certain period of time. According to a preferred embodiment of the invention the different variable e=set−mes is stored in one buffer and the control con in another. Assuming that the amount of samples to be collected during a monitoring period is N, the buffers are e=[e(1), e(2), . . . e(N)] and con=[con(0), con(1), . . . con(N)]. The sample period (for example 1 second) and the updating interval for performance indices to be determined below set the sizes of the buffers. For example, at an updating interval of five minutes and a sample interval of one second a constant N=5*60=300 determining the buffer size is obtained. In addition, information about the manual drive state (am bit) and the forced control state (fc bit) of the control circuit is stored in separate buffers.

Index Calculation

In step 51 of FIG. 5 the data collected in the buffers is used for calculating indices illustrating the performance of the control circuit at suitable intervals. The interval for updating the indices can be selected according to application or computing capacity, but for example an update at an interval of 5 to 15 minutes typically produces a good result.

In the first preferred embodiment of the invention, four different performance indices are calculated:

Variability Index VI, which illustrates the range of variation of the difference value or the measurement;

Control Travel Index CTI, which illustrates the distance traveled by the control con;

Integral Absolute Error IAE, which illustrates the integral of the absolute value of the difference value (control error);

Oscillation Index OI, which is any index indicating oscillation.

The indices VI, CTI and IAE can be determined for example on the basis of the following equations:

$$VI = \max_{k=1...N}(e(k)) - \min_{k=1...N}(e(k))$$

$$CTI = \frac{1}{N}\sum_{k=1}^{N}|con(k) - con(k-1)|$$

$$IAE = \frac{1}{N}\sum_{k=1}^{N}|e(k)|$$

As state above, OI may be any index indicating oscillation, such as the oscillation index described in "Automatic monitoring of control loop performances", Hägglund T., Control Systems, 1994, pp. 190–196. In addition, two flag parameters, a manual mode indicator mmi and a force mode indicator fmi are formed. These flag parameters have the following states:

mmi=1 when the controller has been in manual control mode during the updating interval;

mmi=0 in other cases fmi=1 when the controller has been in forced control mode during the updating interval fmi=0 in other cases.

The on-line calculation unit 100 preferably scales the indices VI, CTI, IAE and OI such that their nominal value is 1. The calculation unit 100 updates the calculated performance indices and the related flag parameters on a regular basis into a database 110. It is to be noted that although the above described performance indices are probably the best for describing control circuit performance for the classification according to the invention, the invention is not restricted to these four indices, but their type and number may vary according to application. In FIG. 1 the performance indices are depicted generally with symbols $I_1 \ldots I_N$.

Fuzzy Logic Deduction

The intelligent control circuit state classification of the invention is carried out using the above calculated performance indices and the manual control and forced control modes of the controller.

In the preferred embodiment of the invention the classification is carried out using fuzzy deduction. A deduction machine 120 retrieves the calculated indices and the related flag parameters from the database 110. In the preferred embodiment of the invention the performance indices VI, CTI, IAE and OI are fuzzified, which means that in step 52 of FIG. 5 the degree of membership of each scaled performance index in the classes high, normal, low and zero is computed. The degree of membership is preferably expressed as a numerical value between 0 and 1.

Figure 4:
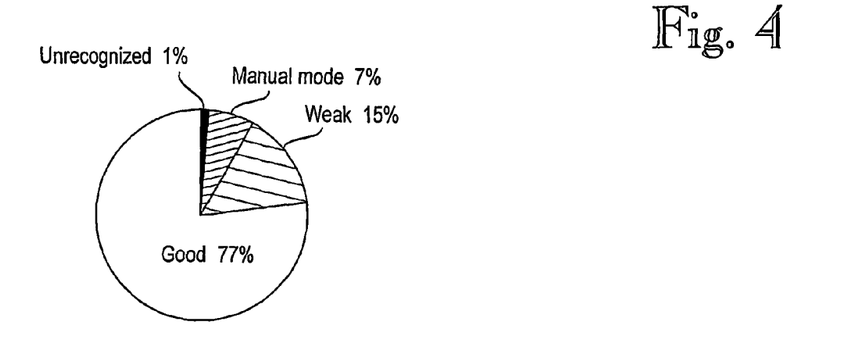
FIG. 4 illustrates a temporal summary produced by a control circuit monitoring of the invention.

Fuzziness is arrived at for example by means of the membership degree functions given to performance indices in FIG. 4. For example, the membership index of a scaled index having a value 0.5 is about 0.9 for class "small", about 0.5 for class "normal", about 0.05 for class "high" and 0 for class "zero". The degree of membership in each of the above classes can be similarly defined for any scaled index value.

In the preferred embodiment of the invention, the scaling of the performance indices to nominal value 1 enables the same membership degree functions to be used for all indices.

After the fuzziness has been completed, each index has four values illustrating its membership in the classes high, normal, low and zero. Combinations of the values of the calculated indices VI, CTI, IAE and OI illustrate different control circuit states. In the invention a computed control circuit state is compared with predetermined example states by means of fuzzy logic. These example states can be determined by means of research and expertise knowledge. The example states applied in the preferred embodiment of the invention are shown in table 1.

TABLE 1

Example states of a control circuit; Z = zero, S = low, M = nominal, L = high.

| vi | cti | iae | oi | ok | |
|---|---|---|---|---|---|
| M | M | M | S | TRUE | OK/normal situation |
| M | S | M | S | TRUE | OK/control travel particularly small |
| M | M | S | S | TRUE | OK/control error particularly small |
| — | — | S | L | TRUE | Post-oscillation state |
| S | L | S | S | TRUE | Noisy measurement, control good |
| L | S | S | S | TRUE | Disturbance peak, control good |
| S | S | S | S | TRUE | OK/control particularly good |
| M | Z | M | S | TRUE | Control not moving, control OK |
| S | M | M | S | TRUE | OK/variability particularly small |
| S | S | M | S | TRUE | OK/small control travel & variability |
| S | M | S | S | TRUE | OK/small control error & variability |
| M | S | S | S | TRUE | OK/small control error & control travel |
| Z | — | Z | — | FALSE | Set value obeys measurement |
| — | M | L | S | FALSE | Load disturbance |
| L | L | S | — | FALSE | Disturbance peak + measurement noise |
| S | L | L | — | FALSE | Noisy load disturbance |
| — | Z | L | — | FALSE | Control saturated |
| L | — | L | S | FALSE | Change of type/load disturbance |
| L | L | L | S | FALSE | Disturbance situation |
| M | L | M | — | FALSE | Measurement noise |
| — | — | L | L | FALSE | Circuit oscillates |
| L | S | L | — | FALSE | Disturbance situation, controller not reacting |
| L | M | M | S | FALSE | Disturbance peak |

Although the example states shown in Table 1 illustrate well the control circuit with regard to the indices VI, CTI, IAE and OI, the invention is not restricted to the example states or to the number of example states shown here.

For example, the control circuit state "control saturated" shown in Table 1 obeys the following conditions: control error index IAE is high (L) and the control travel index CTI is zero (Z). In the interpretation applied in the invention, an indicator is computed for this state to express how well the measured state (momentary index combination) correlates with the example state. If the measured IAE is high and CTI is zero, the indicator obtained for the state "control saturated" is a numerical value close to one. On the other hand, if CTI, for example, is other than zero, the state "control saturated" receives a value which is close to zero.

In the first preferred embodiment of the invention, the deduction machine 120 computes a numerical value ($T_j$) for each line (j=1 . . . M) of the knowledgebase table 1, the numerical value expressing how well the current state of the measured index combination correlates with the example state given in the knowledgebase (FIG. 5, step 53). The computation is based on formula $$T_i = \prod_c \mu_{(i,c)}(I_c)$$

where $T_i$=truth value (0–1) of knowledgebase line i $\mu_{(i,c)}$=membership degree function of knowledgebase line i and column c, selected according to the table from the following: $\mu_L$, $\mu_M$, $\mu_S$, $\mu_X$ $I_c$=value of the scaled index in column c The higher the numerical value $T_i$, the closer the measured state is to the example state. The deduction machine 120 enters the numerical values $T_i$ computed for the lines of knowledgebase 2 into a fuzzy logic deduction machine 130, which carries out the state selection and classification. Also the flag parameters mmi and fmi are transferred to the deduction machine 130.

State Selection and Classification

The invention is applied for monitoring and evaluating the operation of control circuits installed in production plants of the process industry. In the first preferred embodiment of the invention the performance of an individual control circuit is divided into five basic classes:

1. Performance OK
2. Performance not OK
3. Performance unrecognised
4. Controller in manual mode
5. Controller locked The first step in state selection is to check whether the controller has been in the manual mode (mmi=1) or locked (fmi=1) during the period of the index calculation. In that case the controller state is "controller in manual mode" (mmi=1, fmi=0) or "controller locked" (fmi=1 and mmi=0/1). These measures are illustrated in steps 54, 55, 56 and 57 of FIG. 5.

In normal cases (fmi=0 ja mmi=0) the example state that according to the deduction mechanism best correlates with the measured index combination is selected as the control circuit state. In other words, the highest numerical value calculated for $T_i$ is selected to represent the best correlation (FIG. 5, step 58) and thus example state i (the state on line i in knowledgebase 1) corresponding to this numerical value of $T_i$ is selected to illustrate the control circuit state; step 61 in FIG. 5. If none of the $T_i$ values exceeds a predetermined threshold (such as $T_i$=0.5), the selected control circuit state will be "control circuit state unrecognised"; steps 59 and 60 in FIG. 5.

The classification of the control circuit states into "performance OK", "performance not OK" and "performance unrecognised" is based on whether the state is among the accepted states or not, in other words, whether the state line in question in the ok-column of table 1 shows "true" (accepted state) or "false" (not accepted state).

The following examples illustrate this classification:

EXAMPLE 1

During a data collection period of 5 min., the following control circuit performance index values are collected: VI=1.2, CTI=0.01, IAE=2.8, OI=0.1, am=1, fc=0. The indices are scaled so that the nominal value is 1.0. The deduction that can be made from this is that VI is relatively normal, whereas CTI is much lower than normal, IEA is high, and OI is low.

Next, we shall see how the numerical values for the variable $T_i$ are calculated for example states "OK/normal state" and "Control saturated".

According to table 1, "OK/normal state" is a situation in which indices VI, CTI, IAE belong to class M and OI to class S.

Figure 3:
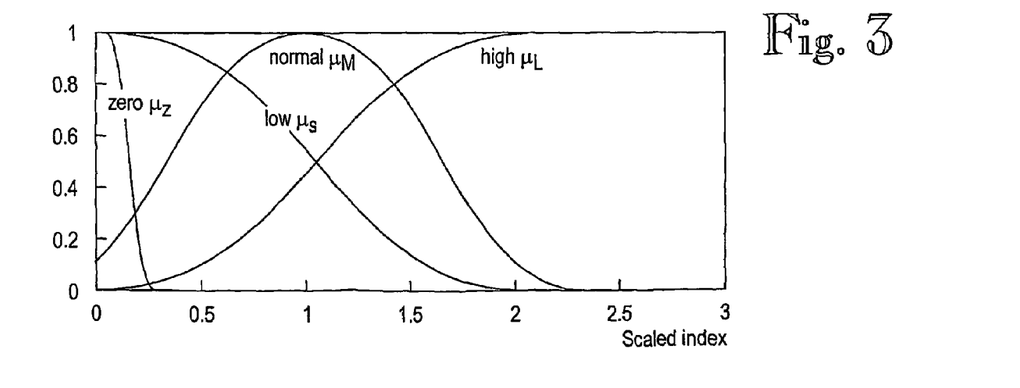
FIG. 3 is a graphic presentation illustrating index membership functions of the invention.

First, value 1.2 of index VI is compared with membership degree function "normal", because there is M (medium) under VI on the first line of table 1. From FIG. 3, the membership function value $\mu_M$=0.9 is obtained for index value 1.2, i.e. the index value is fairly close to normal. Correspondingly, the following is obtained:

VI=1.2: $\mu_{(i,c)}$=0.9 (comparison with class 'normal')

CTI=0.01: $\mu_{(i,c)}$=0.1 (comparison with class 'normal')

IAE=2.8: $\mu_{(i,c)}$=0.01 (comparison with class 'normal')

OI=0.1: $\mu_{(i,c)}$=0.95 (comparison with class 'small')

In the example situation "OK/normal state", the value obtained for the index combination (VI=1.2, CTI=0.01, IAE=2.8, OI=0.1) is Ti=0.9×0.1×0.01×0.95=0.00085, i.e. the index combination does not correlate with the example situation, because the numerical value is low in the scale from 0 to 1.

According to table 1 "Control saturated" is a situation in which indices VI and OI may have any value, IAE belongs to class L and index CTI to class Z.

The membership function values obtained are the following:

VI=1.2: $\mu_{(i,c)}$=1.0 (no comparison, because the index may have any value and therefore there is always a correlation)

CTI=0.01: $\mu_{(i,c)}$=0.99 (compared with class "zero")

IAE=2.8: $\mu_{(i,c)}$=0.99 (compared with class "high")

OI=0.1: $\mu_{(i,c)}$=1.0 (no comparison, because the index may have any value and therefore there is always a correlation)

In the example situation "Control saturated", the value obtained for the index combination (VI=1.2, CTI=0.01, IAE=2.8, OI=0.1) is Ti=1.0×0.99×0.99×1.0=0.98, i.e. the index combination is very close to the example state "Control saturated", because the numerical value is very high in the scale from 0 to 1.

This procedure is applied to all example states of table 1. The maximum value obtained for Ti will be Ti=0.98 and therefore the selected control circuit state will be "Control saturated". Since this state is defined as a "FALSE" state, the control circuit is classified to be in the state "Performance not OK". In FIG. 1 the deduction machine 130 produces a classified control circuit state T as an output. This state T is assigned to a user interface 11 or to another target and/or stored in the database for future analysis.

The control circuit state is presented to the user either as a momentary value (for example with a message "Performance OK" on the display) or as a presentation representing a longer period of time, typically a week or a month. In the latter case the control circuit state may be expressed as a percentage, for example. This is illustrated in the example of FIG. 4, which shows a pie chart that graphically illustrates the following results obtained during one month: Performance OK 77% (Good), not OK 15% (Weak), state unrecognised 1%, the controller in manual mode 7%, and the controller locked 0% of the time (not shown).

In an embodiment of the invention the method also produces a more specific explanation of the states of the control circuit classes "OK" and "not OK". Table 2 shows an example of such presentation of the diagram in FIG. 4. Table 2 shows the temporal percentage of the individual states selected by the deduction machine 130 for a period of one month. The major reason for the poor performance has been that for 13% of the monitoring time of one month, the circuit has been in "Control saturated" state. The invention thus enables the servicing organization of the plant to systematically follow on a general level how well the control functions, and if it does not, the system indicates the reason why the control circuit does not function according to the set objectives. Also situations in which the functioning of the control exceeds the basic objectives are analysed.

TABLE 2

| Weak performance | | Good performance | |
|---|---|---|---|
| Control saturated | 11.6% | Control travel and variability small | 29.5% |
| Load disturbance | 1.9% | Control particularly good | 19.9% |
| Oscillating circuit | 0.9% | Normal state | 18.0% |
| Disturbances, control at rest | 0.3% | Variability particularly small | 6.4% |
| Disturbance peak | 0.1% | Control travel particularly small | 5.3% |
| Oscillation echo | 0.1% | | |

The invention provides a practical means for utilizing information about the control circuit both on an on-line basis in the control room of the industrial plant and afterwards in the different expert analysis and development tasks. A uniform mode of presentation facilitates analysis that is performed afterwards such that known disturbances are removed from the data to be analysed already during the interpretation.

One advantage of the deduction machine is thus its capability to perceive multiple indices simultaneously, which the user may not be capable of. In addition, it always checks also more rarely occurring situations, which might not occur to the user.

The invention can be implemented by means of software in a computer (such as a convention personal computer PC), which serves as an interface with an automation system for collecting measurement data.

The invention and its embodiments are therefore not restricted to the above examples, but they may vary within the scope of the accompanying claims.

The invention claimed is:

1. A method for analysing the performance of a control circuit in an industrial process, comprising:
    collecting from an operating control circuit data illustrating the operation of the control circuit;
    calculating two or more control circuit performance indices on the basis of the collected data;
    calculating for each calculated or scaled performance index its degree of membership in two or more membership degree classes;
    forming predetermined combinations of the membership classes of the performance indices;
    checking whether the control circuit was in an externally controlled operating mode, instead of an automated control mode, during the data collection period, wherein
    if the control circuit was in the externally controlled mode, the control circuit state is not interpreted by means of said performance indices, and
    if the control circuit was not in the externally controlled mode during the data collection period,
    i) evaluating the correlation of each combination with a corresponding reference state by means of the calculated membership degrees, and
    ii) interpreting the reference state that provides the best correlation with one of the combinations to represent the state of the control cicuit; and
    presenting to the user via a user interface the interpreted state of the control circuit, or a proportionate presentation illustrating interpreted states of the control circuit over a longer period of time.

2. A method according to claim 1, further comprising:
    carrying out the interpretation by means of fuzzy logic deduction.

3. A method according to claim 1, wherein the step of interpretation comprises:
    calculating for each calculated or scaled performance index its degree of membership in two or more membership degree classes;
    forming predetermined combinations of the membership classes of the performance indices;
    evaluating the correlation of each combination with a corresponding reference state by means of the calculated membership degrees;
    interpreting the reference state that provides the best correlation with one of the combinations to represent the state of the control circuit.

4. A method according to claim 1, further comprising:
    classifying the control circuit reference states either into a class in which the control circuit functions correctly or into a class in which the control circuit functions incorrectly; and
    determining according to the selected operational mode of the control circuit whether the circuit functions correctly or incorrectly at a given moment.

5. A method according to claim 3, comprising:
    calculating a numerical value for each predetermined combination of membership classes of performance indices to indicate how well the current state of the measured index combination correlates with the corresponding reference state;

interpreting the reference state that obtains a numerical value providing the best correlation to represent the state of the control circuit.

6. A method according to claim 5, wherein the data illustrating the operation of the control circuit comprises information indicating whether the control circuit is in an automated control mode or in a control mode in which the operation of the control circuit is externally controlled or locked, such as in a manual or forced control mode;

if the control circuit is in some other than the automated control mode, the mode in question is interpreted to represent the state of the control circuit, irrespective of the state interpreted on the basis of the performance indices.

7. A method for analysing the performance of a control circuit in an industrial process, comprising:

collecting from an operating control circuit data illustrating the operation of the control circuit;

calculating two or more control circuit performance indices on the basis of the collected data; and interpreting the state of the control circuit by examining how the values of predetermined combinations of the calculated performance indices correlate with the predetermined values of the combinations representing different predetermined reference states of the control circuit;

presenting to the user via a user interface the interpreted state of the control circuit, or a proportionate presentation illustrating interpreted states of the control circuit over a longer period of time, wherein the performance indices comprise two or more of the following: a variability index, control travel index, integral absolute error index, and oscillation index.

8. A method for analysing the performance of a control circuit in an industrial process, comprising:

collecting from an operating control circuit data illustrating the operation of the control circuit;

calculating two or more control circuit performance indices on the basis of the collected data; and interpreting the state of the control circuit by examining how the values of predetermined combinations of the calculated performance indices correlate with the predetermined values of the combinations representing different predetermined reference states of the control circuit;

presenting to the user via a user interface the interpreted state of the control circuit, or a proportionate presentation illustrating interpreted states of the control circuit over a longer period of time, wherein the data illustrating the operation of the control circuit comprises a set value, control value and measured control response of the control circuit.

9. A diagnostics system for analysing the performance of a control circuit in an industrial process, the system comprising:

means for collecting from an operating control circuit data illustrating the operation of the control circuit;

means for calculating two or more performance indices for the control circuit by means of the collected data;

means for deducing the control circuit state by correlating the values of predetermined combinations of the calculated performance indices with the predetermined values of the combinations, which represent various predetermined control circuit states; and means for presenting to the user via a user interface the interpreted state of the control circuit, or a proportionate presentation illustrating interpreted states of the control circuit over a longer period of time, wherein the performance indices comprise two or more of the following: a variability index, control travel index, integral absolute error index, and oscillation index.

10. A diagnostics system for analysing the performance of a control circuit in an industrial process, the system comprising:

means for collecting from an operating control circuit data illustrating the operation of the control circuit;

means for calculating two or more performance indices for the control circuit by means of the collected data;

means for deducing the control circuit state by correlating the values of predetermined combinations of the calculated performance indices with the predetermined values of the combinations, which represent various predetermined control circuit states; and means for presenting to the user via a user interface the interpreted state of the control circuit, or a proportionate presentation illustrating interpreted states of the control circuit over a longer period of time, wherein the data illustrating the operation of the control circuit comprises a set value, control value and measured control response of the control circuit.

11. A system according to claim 10, wherein the deduction means comprise a deduction machine based on fuzzy logic.

12. A system according to claim 10, wherein the deduction means comprise:

means for calculating for each calculated or scaled performance index its degree of membership in two or more membership degree classes;

means for forming predetermined combinations of the membership classes of the performance indices;

means for evaluating the correlation of each combination with the corresponding reference state by means of the calculated membership degrees;

means for interpreting the reference state that provides the best correlation with one of the combinations to represent the state of the control circuit.

13. A system according to claim 10, wherein the deduction machine comprises:

means for calculating a numerical value ($I_1$–$I_N$) for each predetermined combination of control circuit index membership functions by means of the calculated membership degrees to indicate how well the current state of the measure index combination correlates with the corresponding reference state; and means for interpreting the reference state that obtains a numerical value providing the best correlation to represent the state of the control circuit.

14. A system according to claim 10, wherein the deduction machine comprises:

means for classifying the control circuit reference states into a class in which the control circuit functions correctly and into a class in which the control circuit functions incorrectly; and means for determining according to the selected operational mode of the control circuit whether the circuit functions correctly or incorrectly at a given moment.

15. A diagnostics system for analysing the performance of a control circuit in an industrial process, the system comprising:

means for collecting from an operating control circuit data illustrating the operation of the control circuit;

means for calculating two or more performance indices
for the control circuit by means of the collected data;
means for deducing the control circuit state by correlating
the values of predetermined combinations of the calculated performance indices with the predetermined
values of the combinations, which represent various
predetermined control circuit states; and
means for presenting to the user via a user interface the
interpreted state of the control circuit, or a proportionate presentation illustrating interpreted states of the
control circuit over a longer period of time, wherein
the data illustrating the operation of the control circuit
comprises information indicating whether the control
circuit is in an automated control mode or in a control
mode in which the operation of the control circuit is
externally controlled or locked, such as in a manual or
forced control mode, wherein
if the control circuit is in some other than the automated
control mode, the deduction means interpret mode in
question to represent the state of the control circuit,
irrespective of the state interpreted on the basis of the
performance indices.

16. A data storage device, comprising a computer executable routine configured to:
collect from an operating control circuit data illustrating
the operation of the control circuit, said data including
a set value, control value and measured control
response of the control circuit;
calculate two or more control circuit performance indices
on the basis of the collected data; and
interpret the state of the control circuit by examining how
the values of predetermined combinations of the calculated performance indices correlate with the predetermined values of the combinations representing different predetermined reference states of the control
circuit; and
present to the user via a user interface the interpreted state
of the control circuit, or a proportionate presentation
illustrating interpreted states of the control circuit over
a longer period of time.

17. A diagnostics system for analysing the performance of
a control circuit in an industrial process, the system comprising:
means for collecting from an operating control circuit data
illustrating the operation of the control circuit;
means for calculating two or more control circuit performance indices on the basis of the collected data;
means for calculating for each calculated or scaled performance index its degree of membership in two or
more membership degree classes;
means for forming predetermined combinations of the
membership classes of the performance indices;
means for checking whether the control circuit was in an
externally controlled operating mode, instead of an
automated control mode, during the data collection
period, wherein
if the control circuit was in the externally controlled
mode, the diagnostics system disables interpretation of
the control circuit state based on said performance
indices, and
if the control circuit was not in the externally controlled
mode during the data collection period, the diagnostics
system is configured to:

i) evaluate the correlation of each combination with a
corresponding reference state by means of the calculated membership degrees, and
ii) interpret the reference state that provides the best
correlation with one of the combinations to represent
the state of the control circuit; and
means for presenting to the user via a user interface the
interpreted state of the control circuit, or a proportionate presentation illustrating interpreted states of the
control circuit over a longer period of time.

18. A data storage device, comprising a computer executable routine configured to
collect from an operating control circuit data illustrating
the operation of the control circuit;
calculate two or more control circuit performance indices
on the basis of the collected data;
calculate for each calculated or scaled performance index
its degree of membership in two or more membership
degree classes;
form predetermined combinations of the membership
classes of the performance indices;
check whether the control circuit was in an externally
controlled operating mode, instead of an automated
control mode, during the data collection peried,
wherein
if the control circuit was in the externally controlled
mode, to disable interpretation of the control circuit
state based on said performance indices, and
if the control circuit was not in the externally controlled
mode during the data collection period,
i) evaluate the correlation of each combination with a
corresponding reference state by means of the calculated membership degrees, and
ii) interpret the reference state that provides the best
correlation with one of the combinations to represent
the state of the control circuit; and
present to the user via a user interface the interpreted state
of the control circuit, or a proportionate presentation
illustrating interpreted states of the control circuit over
a longer period of time.

19. A data storage device, comprising a computer executable routine configured to
collect from an operating control circuit data illustrating
the operation of the control circuit;
calculate two or more control circuit performance indices
on the basis of the collected data, said performance
indices comprising two or more of the following: a
variability index, control travel index, integral absolute
error index, and oscillation index;
interpret the state of the control circuit by examining how
the values of predetermined combinations of the calculated performance indices correlate with the predetermined values of the combinations representing different predetermined reference states of the control
circuit; and
present to the user via a user interface the interpreted state
of the control circuit, or a proportionate presentation
illustrating interpreted states of the control circuit over
a longer period of time.

* * * * *